SWITCHING NETWORK

Original Filed Nov. 1, 1955

2 Sheets-Sheet 1

INVENTORS
GRANT W. BOOTH &
CHARLES S. WARREN
BY Morris L. Rabkin
ATTORNEY

SWITCHING NETWORK

Original Filed Nov. 1, 1955

INVENTORS
GRANT W. BOOTH &
CHARLES S. WARREN
BY Morris Rabin
ATTORNEY 3,312,941
SWITCHING NETWORK Grant W. Booth, Framingham, Mass., and Charles S. Warren, Riverside, N.J., assignors to Radio Corporation of America, a corporation of Delaware Continuation of application Ser. No. 544,280, Nov. 1, 1955. This application June 24, 1963, Ser. No. 293,922
6 Claims. (Cl. 340—166)

This is a continuation of application Ser. No. 544,280, filed Nov. 1, 1955.

This invention relates to switching networks, and particularly to switching networks using transistors.

Switching networks are used, for example, in commutating and distributing applications for selecting one out of many signal lines for receiving or transmitting an electric signal. Known types of such devices include arrays of bistable elements wherein any one element and its connected signal line are selected by applying to the array inputs a combination of address signals corresponding to that element. It is often desirable to provide a switching network of this type that offers a relatively low electrical resistance path from a common source to the signal line of the array element. It is further desirable to provide a switching network that, in addition to performing a selection function, also operates to amplify the address signals, thereby permitting the use of signals in controlling the array of lower power level than otherwise would be possible.

It is an object of the present invention to provide an improved switching network of the last-mentioned type which operates to select a desired signal line and which operates to amplify signals used in selecting the desired line.

Another object of the present invention is to provide an improved switching network using transistors of different conductivity types which provides a relatively low resistance path between a common source and any selected one of a plurality of signal lines.

Still another object of the present invention is to provide an improved transistor network using fewer transistors than networks of a similar type heretofore known.

According to the invention, a switching network has respective ones of a plurality of signal lines connected to separate ones of an array of transistors, and has a desired one of the signal lines selected by providing separate bias means for the base and emitter electrodes of the arrayed transistors so arranged that a selected one of the arrayed transistors may be placed in conductive condition.

An array of transistors may be arranged, for example, in rows and columns; a first group of transistors of the same conductivity type as the arrayed transistors may control selection of the array columns, and a second group of transistors of conductivity type opposite that of the arrayed transistors may control the selection of the array rows. The selected signal line is the one connected to the one transistor of the array located at the intersection of a selected row and column. All the signal paths, including the signal lines, may be normally open. When a signal line is selected, a signal path is completed from a common reference source through the collector-emitter path of one or more transistors of the first or second group and the collector-emitter path of the selected array transistor to the selected signal line. This signal path is one of a relatively low resistance, say in the order of a few hundred ohms; the non-selected signal lines provide relatively high resistance paths, say in the order of a megohm or more, according to the particular circuit configuration. The transistors of the first and second groups and the selected array transistor each furnish a stage of amplification. Accordingly, a relatively high current supplied from a source to the signal lines can be controlled by relatively low current signals applied to the first and second transistor groups.

The invention will be further explained in connection with the following description and the accompanying drawing wherein.

Figure 1:
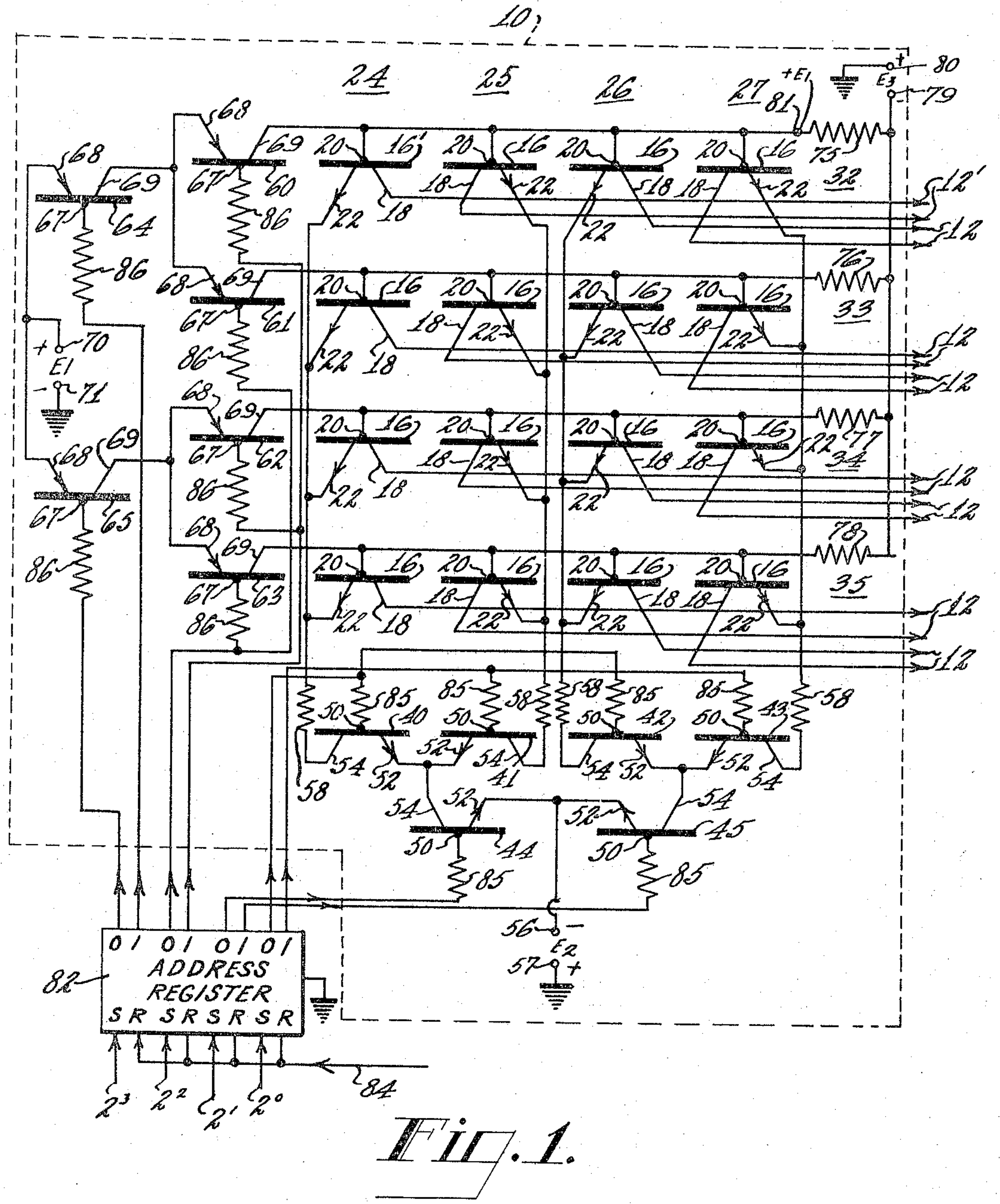
FIG. 1 is a schematic diagram of a switching network according to the invention.

Referring to FIG. 1, a switching network 10 has a plurality, for example sixteen, of signal lines 12. The signal lines 12 are connected respectively to the collector electrodes 18 of different ones of a 4 x 4 array of transistors 16. The transistors 16 are all of one conductivity type; for example, the NPN type. Each has, in addition to the collector electrode 18, a base electrode 20 and an emitter electrode 22. The array transistors 16 may be arranged, for example, in four columns 24–27 and four rows 32–35. The four columns 24–27 are selected, one at a time, under the control of a first group of six transistors 40–45 arranged, for example, in a pyramid array. Each of the transistors 40–45 is of the conductivity type NPN, and each has a base electrode 50, an emitter electrode 52, and a collector electrode 54. The collector electrodes 54 of the upper four transistors 40–43 of the first group are respectively connected serially through four current-limiting resistors 58 to all the emitter electrodes 22 of the respective four columns 24–27 of the arrayed transistors 16. The upper four transistors 40–43 of the pyramid are controlled in pairs by the lower two transistors 44 and 45 thereof by connecting the collector electrode 54 of the lower transistor 44 to the emitter electrodes 52 of the transistors 40 and 41, and by connecting the collector electrode 54 of the lower transistor 45 to the emitter electrodes 52 of the transistors 42 and 43. The emitter electrodes 52 of the transistors 44 and 45 are connected to the negative terminal 56 of a voltage source E2 which has its positive terminal 57 connected to a common reference point, indicated in the drawing as the conventional ground symbol.

The four rows 32–35 of the array transistors are selected, under the control of two different ones of a second group of six transistors 60–65, also arranged in a pyramid array. Each of the transistors 60–65 is of the PNP conductivity type and each has a base electrode 67, an emitter electrode 68, and a collector electrode 69. The collector electrodes 69 of the four transistors 60–63 of the second group are connected respectively to all the base electrodes 18 of the separate rows 32–35 of the arrayed transistors 16. The four transistors 60–63 of the second group are controlled in pairs by the other two transistors 64 and 65 of the second group by connecting the collector electrode 69 of the transistor 64 to the emitter electrodes 68 of the first pair 60 and 61, and the collector electrode 69 of the transistor 65 to the emitter electrodes 68 of the other pair 62 and 63. The emitter electrodes 68 of the two transistors 64 and 65 are connected to the positive terminal 70 of a bias source E1 which has its negative terminal 71 connected to the common ground. The collectors 69 of the transistors 60–63 are connected respectively in series with separate ones of four collector resistors 75–78 to the negative terminal 79 of a second bias source E3 which has its positive terminal 80 connected to the common ground. Each of the base electrodes 20 of the four rows 32–35 of arrayed transistors 16 are connected to one terminal 81 of the separate collector resistors 75–78. Accordingly, the source E3 normally reverse biases the transistors 16 of the 4 x 4 coordinate array.

An address register 82 is used for selecting a desired signal line 12 in accordance with the binary digits $2^0$–$2^3$ of a four-position binary code. The four binary digits $2^0$–$2^3$ are sufficient for selecting any one of the sixteen signal lines 12 in the exemplary embodiment. The address register 82 may be any known type register; for example, a flip-flop register. Each of the flip-flops of the address register 102 has a set (S) and a reset (R) input and corresponding "1" and "0" outputs. When a flip-flop is in a set condition, a relatively high output signal is furnished on its "1" output and when it is in a reset condition, a relatively low output signal is furnished on its "1" output. When a flip-flop is in a reset condition, a relatively high signal is furnished on its "0" output, and when it is in a set condition, a relatively low level signal is furnished on its "0" output. A pulse may be applied on a common reset line 84 for resetting the address register flip-flops during operation. The $2^0$–$2^3$ flip-flops of the address register 82 may be connected to the common ground.

The first two binary digits $2^0$–$2^1$ are used for selecting a desired column of the arrayed transistors 16. Each of the transistors 40–45 has a separate bias resistor 85 connected to its base electrode 50. The "0" and "1" outputs of the $2^1$ flip-flop of the address register 82 are connected respectively to the bias resistors 85 of the transistors 44 and 45. The "0" output of the $2^0$ address register flip-flop is connected to the bias resistors 85 of the transistors 40 and 42, and the "1" output of the $2^0$ flip-flop is connected to the bias resistors 85 of the transistors 41 and 43. The other two binary digits $2^2$–$2^3$ are used in selecting a desired one of the rows 32–35 of the array transistors 16. Each of the transistors 60–65 of the second group has a separate bias resistor 86. The "1" and the "0" outputs of the $2^3$ flip-flop are connected, respectively, to the bias resistors 86 of the transistors 64 and 65. The "1" output of the $2^2$ flip-flop is connected to the bias resistors 86 of the transistors 60 and 62, and the "0" output of the $2^2$ flip-flop is connected to the bias resistors 86 of the transistors 61 and 63 of the second group.

In operation, the combination of binary digits $2^0$–$2^3$, corresponding to the address of the selected array transistor 16 which is to be connected to the desired signal line 12, is set into the address register 82. The outputs of the address register 82 then operate to bias this one array transistor 16 to a forward conduction condition. For example, assume that it is desired to select the top signal line 12′ connected to the first row and column transistor 16 whose binary address is 0000. For convenience of description, the top signal line 12 is designated 12′ and the first row and column transistor is designated 16′. Accordingly, each of the flip-flops $2^0$–$2^3$ of the address register 82 is placed in a reset condition by a pulse applied to the common reset line 84, thereby making the "0" output voltage of the $2^0$–$2^3$ flip-flops high relative to their "1" output voltages.

The high-level "0" outputs of the $2^0$–$2^1$ flip-flop respectively apply a forward bias on the transistors 40 and 44 of the first group, placing each in a conductive condition. The low-level "1" outputs of the $2^3$–$2^2$ flip-flops respectively apply a forward bias on the transistors 64 and 60 of the second group, placing each in a conductive condition. Accordingly, the base electrodes 20 of the first row 32 of transistors 16, and the emitter electrodes 22 of the first column 24 of transistors 16 assume a positive potential approximately equal to the value of $+E_1$. This positive potential results when current flows through the emitter-to-base diode of transistor 16′ and thence through the path which includes resistor 58, the emitter-to-collector paths of transistors 40 and 44, and the source E2. Therefore, the transistor 16′ has a forward bias and is placed in a conductive condition. Each of the other array transistors 16 in the rows 33–35 has a reverse bias due to the negative potential $-E_3$ applied to their base electrodes 20 via the collector resistors 76–78 connected in the respective rows 33–35 of array transistors 16. The three remaining array transistors 16 of the first row 32 remain cut off due to the reverse bias placed on the transistors 41 and 43 and the transistor 45 by the low-level output of the "1" side of the flip-flops $2^0$ and $2^1$, respectively.

The "0" output of the $2^0$ flip-flop also biases the transistor 42 of the first group 40–45 to a conductive condition. However, the signal path through this transistor remains open due to the reverse bias on the transistor 45. Similarly, the "1" output of the $2^2$ flip-flop biases the transistor 62 of the second group 60–65 to a conductive condition, but current flow is prevented due to the reverse bias placed on the transistor 65.

Accordingly, the signal path from the desired signal line 12′ is completed via the collector-to-emitter path of the selected array transistor 16′, the current-limiting resistor 58 of the first column 24, and the collector-to-emitter paths of the transistors 40 and 44 of the first group, and then through the source E2 to the common ground. The resistance of this path may be, for example, two hundred ohms and, in practice, is determined by the value of the current-limiting resistor 58. Each of the other signal paths, including a signal line 12, remains in an open condition and each has a resistance, for example, of a megohm or more, because the resistance of any open path is determined by the collector-to-emitter resistance of one or more reversed-biased transistors.

Note that the transistors 64 and 60 of the second group respectively amplify the $2^3$ and $2^2$ flip-flop currents applied to their base electrodes 67, and that the selected array transistor 16′ also amplifies the current applied to its base electrode 20. Accordingly, in the exemplary embodiment, the $2^3$ and $2^2$ flip-flop currents used in controlling the selection of the signal line 12 receive two stages of current amplification. Similarly, the transistors 40 and 44 of the first group each operate to amplify currents applied to their base electrodes 50 by the $2^0$ and $2^1$ flip-flops. Therefore, the flip-flop currents required to control any given current flowing in a signal line 12 may be substantially reduced below that which would be required without amplification. An even increased reduction of the flip-flop currents required is obtained in larger array using a larger number of transistors in the first and second groups.

Any other one of the signal lines 12 can be selected in like manner by setting the address of the array transistor 16 of that line into the address register 82. The $2^0$–$2^3$ and the reset inputs of the address register 82 may be controlled by any suitable means, for example, a digital computer.

The arrayed transistors 16, the first group of transistors 40–45, and the second group of transistors 60–65, respectively, can be of the opposite conductivity type from those described in FIG. 1. Thus, the array transistors 16 may be the PNP type; the first group 40–45 of transistors the PNP type, and the second group 60–65 of transistors the NPN type. The bias sources E1, E2 and E3 are then changed in appropriate fashion to accommodate the different types of transistors. In such case the "1" and "0" outputs of the address register 82 are reversed; otherwise, the arrangement and the operation of the switching network 10 is similar to that just described. The array transistors 16 of a switching network may be selected by using other selecting means in place of the first and second groups of transistors. For example, either one or both of the first and second group of transistors could be replaced by crystal diode matrices each having two binary inputs and four corresponding outputs. The respective outputs of the diode matrices then would be connected to the rows or columns of the arrayed transistors 16.

In the exemplary embodiment, one of the signal lines 12 is always selected because all sixteen combinations of the binary digits $2^0$–$2^3$ are used. If desired, the array transistor 16', corresponding to the reset condition of the address register 82 may be omitted, thereby causing any one of the remaining signal lines 12 to be selected only when its corresponding address is set into the address register 82. Other arrays of transistors 16 than a square array may be used, for example, a rectangular array, a hexagonal array, or a Christmas-tree array may be employed.

A plurality of switching networks, according to the invention, may be employed for operating a known coincident current, magnetic core memory. For example, the memory system 90 of FIG. 2 includes a 16 x 16 matrix 92 of magnetic memory cores arranged in sixteen rows and sixteen columns. Separate ones of the row coils 94 are linked to the memory cores in the separate rows of the memory 92, and separate ones of the column coils 96 are linked to the memory cores of the separate columns in the memory 92. A row switch 98 and a column switch 100 are used in applying current respectively to the one row coil 94 and the one column coil 96 which intersect in any desired one of the memory cores of the memory 92. Details of suitable row and column switches 98 and 100 are described hereinafter in connection with FIGS. 3 and 4. Each of the row and column switches 98 and 100 has sixteen separate current switches, and each current switch has a read winding and a write winding. Separate ones of row current switches are coupled to the separate row lines 94, and separate ones of the column current switches are coupled to the separate column lines 96. The sixteen inputs of the row switch 98 are supplied via a first transistor matrix 10', and each of the sixteen inputs to the column switch 100 is supplied via a second transistor matrix 10''. The matrices 10' and 10'' are each similar to the switching network 10 of FIG. 1. An address register 102 has eight binary outputs $2^0$–$2^7$. The first four binary inputs $2^0$–$2^3$ of the address register 102 are applied to the first and second groups of transistors in the first selection matrix 10', in the manner described, for the four binary digits $2^0$ and $2^3$ of FIG. 1, and the $2^4$–$2^7$ outputs of the address register 102 applied to the second selection matrix 10'' in a similar manner. The eight set "S" inputs and the common reset input (R) of the address register 102 may be furnished under the control of any suitable means, for example, a digital computer. A pair of read drivers and a pair of write drivers are used to apply current pulses coincident in time to the row and column switches 98 and 100. One read driver of the pair is connected to all the sixteen read windings of the row switch 98, and the other read driver of the pair is connected to all the sixteen read windings of the column switch 100. One of the pair of write drivers is connected to all the sixteen write windings of the row switch 98, and the other write driver of the pair is connected to all the sixteen write windings of the column switch 100. The read and write drivers may be, for example, known vacuum-type circuits which operate to apply a pulse of constant current for its duration to the read and write windings of the row and column switches 98 and 100.

Figures 2, 3, 4, 5:
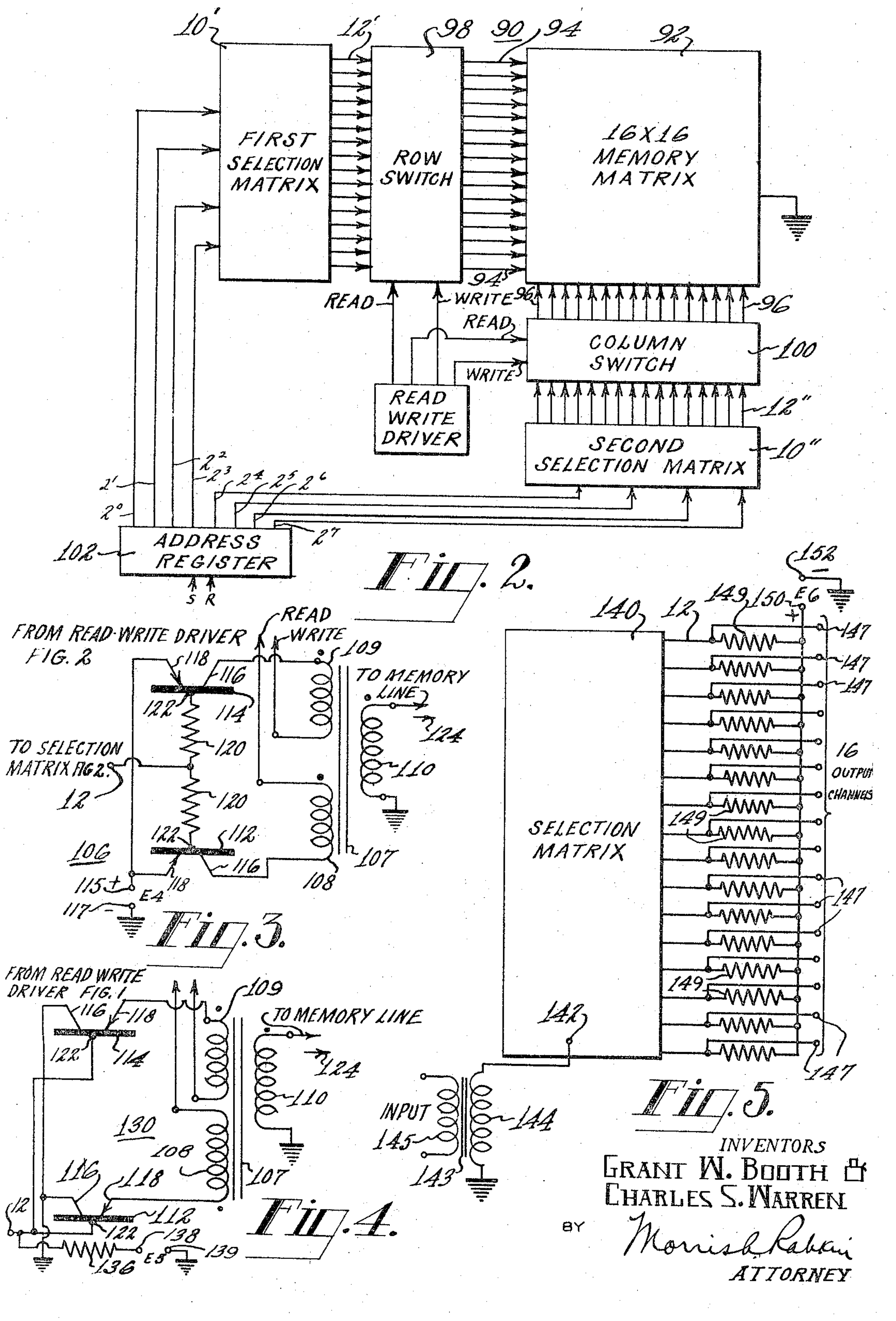
FIG. 2 is a schematic diagram of a memory system utilizing first and second switching matrices according to the invention.
FIGS. 3 and 4 are schematic diagrams of suitable circuits for applying bipolarity current pulses to the memory system of FIG. 2 under the control of the selection matrices, according to the invention.
FIG. 5 is a schematic diagram of one system for commutating time-varying input signals to a selected output channel.

FIGURE 3 is a schematic diagram of one suitable form of current-switch 106 for applying read-write pulses to the selected memory lines. Each of the sixteen current switches in the row and column switches 98 and 100 may be similar to that of FIG. 3. The current switch 106 includes a pulse transformer 107 having as primary windings a read winding 108 and a write winding 109. The secondary winding 110 is connected to one of the row or column coils 94 or 96 of the memory matrix 92 (FIG. 2). The two primary windings 108 and 109 are oppositely polarized so that the same polarity current pulses applied to the primary windings induce opposite polarity currents in the connected memory line. One terminal of each of transformer 107 windings 108–110 has a dot placed adjacent thereto to indicate the sense of linkage in the conventional transformer manner. Two transistors 112 and 114 are used to control current flow in the primary windings 108 and 109 of the transformer 107. The collector electrode 116 of the transistor 112 is connected to the unmarked terminal of the first primary winding 108, and the collector electrode 116 of the transistor 114 is connected to the marked terminal of the other primary winding 109. The emitter electrodes 118 of the transistors 112 and 114 are each connected to the positive terminal 115 of a bias source E4 which has its negative terminal 117 connected to the common ground. Each of the transistors 112 and 114 is normally cut-off. Separate base resistors 120 are connected to the base electrodes 122 of the transistors 112 and 114. One of the signal lines 12 of a transistor selection matrix 10 is connected to the junction between the two base resistors 120. When the signal line 12, connected to one of the current switches 106, is selected, each of the base electrodes 122 of the transistors 112 and 114 is established at approximately the voltage slightly below a value of $+E_1$, as explained in connection with the switching network 10 of FIG. 1. Each of the transistors 112 and 114, therefore, are biased in the forward direction and are in a conductive condition. A negative current pulse applied to the first primary winding 108 then flows through the transformer winding 108 and the collector-to-emitter path of the transistor 112 and then the source E4 to ground. The current flow in the primary winding 108 induces a current in the direction of the arrow 124 in the connected memory line 94 or 96. A negative current pulse supplied to the other primary winding 109 flows through the collector to the emitter path of the transistor 112, and then through the source E4 to ground. Current flow in the winding 109 induces a current in a direction opposite that of the arrow 124 in the connected memory line 94 or 96. Thus, by selecting one current switch in the row switch 98 and the column switch 100, information may be read from and written into any desired one of the memory cores of the memory matrix 92.

Another form of a suitable current switch for the row and column switches 98 and 100 is that of the switch 130 of FIG. 4. The current switch 130 is similar to that of the current switch 106 of FIG. 3 with the exception that the connection of the two transistors 112 and 114 is changed. Here the two emitter electrodes 118 are respectively connected to the two primary windings 108 and 109 of the transformer 107, and each of the collector electrodes 116 is connected to the common ground. The base electrodes 122 are directly connected to one of the signal lines 12 of a transistor selection matrix. A base resistor 126 has one terminal connected to a junction point between the signal line 12 and the base electrodes 122 of the transistors 112 and 114; the other terminal of the base resistor 126 is connected to the positive terminal 138 of a bias source E5. The negative terminal 139 of the source E5 is connected to the common ground. When a current switch arranged as the current switch 130 is used, the bias source E2 of the switching network 10 (FIG. 1) is omitted, and the emitter electrodes 52 of the transistors 44 and 45 of the first group are connected directly to ground. In such case, when the signal line 12, connected to the current switch 130 (FIG. 4), is selected, the base electrodes 122 of the PNP transistors 112 and 114 assume a bias of a value determined by the voltage drop across the base resistor 136, and the transistors 112 and 114 are placed in a conductive condition. Separate currents supplied to the primary windings 108 and 109 then flow through the emitter-to-collector paths of the transistors 112 and 114 to the common ground. The current flows in the primary windings 108 and 109 then induce opposite-polarity currents in the connected memory line. If desired, a separate emitter-follower amplifier can be connected between each of the signal lines 12 of a selection matrix, and a current switch, such as the current switches 106 and 130, in order to furnish an additional stage of current amplification.

A transistor switching network 140 adapted to commutate time-varying input signals is shown in FIG. 5. The switching network 140 is similar to that of FIG. 1 except that the bias source E2 is omitted and the emitter electrodes 52 of the transistors 44 and 45 of the first group are connected to a matrix input terminal 142. Linear transformer 143 has one terminal of its secondary winding 144 connected to the matrix terminal 142 and its other terminal connected to ground. The time-varying input signals are applied across the terminals of the primary winding 145 of the transformer 142. The switching network 140 has sixteen different output channels 147. The separate output channels are connected to the separate signal lines 12. All the output channels 147 are connected through separate series resistances 149 to the negative terminal 150 of a bias source E6; the positive terminal 152 of the bias source is connected to ground. When an input signal is applied to the primary winding 145 of the linear transformer 143, a corresponding voltage appears across the one resistor 149 connected to the selected signal line 12 of the switching network 140. The drop across the one resistor 149 is applied to the connected output channel 147. Thus, the input signals can be commutated successively to desired ones of the output channels 147 by successively selecting signal lines 12 in the manner described for the switching network 10 of FIG. 1.

There has been described herein an improved transistor switching network wherein a described one of a plurality of signal lines can be selected in accordance with selection signals arranged in a combinatorial code. Networks according to the present invention are advantageous in that, in selecting the output line, the transistors provide a low-resistance path to applied signals and also operate to amplify the selection signals.

What is claimed is:

1. In combination:

a coordinate array of transistors, of given conductivity type, arranged in columns and rows;

means providing a plurality of input signals;

source means providing two operating voltages of different value;

a row selection array of transistors of one conductivity type connected to receive the operating voltage of one of said values for applying a voltage to the base electrodes of one row of the transistors in the coordinate array in response to a particular combination of said input signals applied to the transistors of the row selection array; and a column selection array of transistors of opposite conductivity type of the transistors of the row selection array connected to receive the operating voltage of said other value for applying a voltage to the emitter electrodes of one column of the transistors in the coordinate array in response to a particular combination of said input signals applied to the transistors of the column selection array, which voltage is in the forward direction relative the voltage applied to the base electrode of the transistor in the coordinate array which is common to the row and column thereof selected by the row and column arrays, for placing said transistor in condition to conduct.

2. A first and second group of elements as set forth in claim 1;

a plurality of loads; and two sets of switch means, one set coupled between one coordinate array of transistors and the loads and the other set coupled between the other coordinate array of transistors and the loads, each switch means in a set comprising a pair of normally open switches, one for supplying a current in one direction to its load and the other for supplying a current in the opposite direction to its load, each pair of switches, when actuated by a selected transistor in a coordinate array, being placed in condition to be closed, and further including means coupled to said pairs of switches for closing, in each set of switch means, one switch in an actuated pair of switches and maintaining the other switch open, whereby current flows through the closed switch in one switch means in a given direction to its load, and through the closed switch in the other switch means in a given direction to its load.

3. The combination set forth in claim 2, wherein each pair of switches comprises a pair of transistors normally in a cut-off condition, the selected transistor in a coordinate array applying a forward bias to a selected pair of said transistors placing them both in condition to conduct, and further including means coupled to the emitter-to-collector paths of said transistors for causing current to flow through one transistor of said selected pair of transistors.

4. In combination:

a coordinate array of transistors arranged in columns and rows;

means providing a plurality of input signals;

source means providing two operating voltages of different value;

a row selection array of PNP transistors connected to receive the relatively positive one of said operating voltages coupled to one electrode the transistors of the coordinate array for applying a relatively positive voltage to that electrode in one row of the transistors in the coordinate array in response to a particular combination of said input signals applied to the transistors of the row selection array; and a column selection array of NPN transistors connected to receive the relatively negative one of said operating voltages and coupled to another electrode of the transistors of the coordinate array for applying a relatively negative voltage to said other electrode in one column of the transistors in the coordinate array in response to a particular combination of said input signals applied to the transistors of the column selection array; and one of said two electrodes comprising a base electrode and the other an emitter electrode, and said two voltages being applied by said two selection arrays in a sense to forward bias the transistor in the coordinate array which is common to the row and column thereof selected by said selection arrays.

5. A switching network comprising:

an array of transistors arranged in columns and rows in a coordinate array;

first and second pyramid arrays of other transistors, each transistor having a collector, an emitter and a base electrode, the transistors of said coordinate array and of one of said pyramid arrays being of one conductivity type and the transistors of said second pyramid array being of the opposite conductivity type; and each such pyramid array having a group of output transistors, in one case equal to the number of rows in the coordinate array and in the other case equal to the number of columns in the coordinate array;

operating voltage source means coupled to the transsistors of the first and second pyramid arrays for supplying an operating voltage of one value in the forward direction to the transistors of the first pyramid array and an operating voltage of a different value in the forward direction to the transistors of the other pyramid array;

means connecting the collector electrodes of the output transistors of said first pyramid array to the base electrodes of the respective rows of transistors in said coordinate array;

means connecting the collector electrodes of the output transistors of said second pyramid array to the emitter electrodes of the respective columns of transistors in said coordinate array;

a source of input signals; and means for applying separate ones of said input signals to the transistors of said first and second pyramid arrays, each said pyramid array having a selected output in response to a particular combination of said input signals applied to that pyramid array, said selected outputs of said first and second pyramid arrays jointly operating to place a bias in the forward direction between the base and emitter electrodes of one transistor in said coordinate array.

6. A switching array comprising:

a plurality of loads;

a plurality of coupling means connected respectively to said loads;

a first plurality of drive lines coupled respectively to each of said loads;

a second plurality of drive lines coupled respectively to each of said loads;

a first array of switching transistors, including a source of operating current, coupled to said first plurality of drive lines;

a second array of switching transistors, including a source of operating current, coupled to said second plurality of drive lines;

control means coupled to said first and second arrays of switching transistors for rendering preselected transistors conductive in said arrays thereby to direct current flow through preselected ones of said coupling means and loads via preselected ones of said drive lines;

each coupling means comprising a pair of further transistor elements; and further control means coupled to said further transistor elements for controlling the conductivity of individual transistors of two selected pairs thereof thereby to determine the directions of current flow through two selected loads.

References Cited by the Examiner

UNITED STATES PATENTS

| | | | |
|---|---|---|---|
| 2,627,039 | 1/1953 | MacWilliams | 340—166 |
| 2,913,704 | 11/1959 | Huang | 340—166 |
| 2,960,681 | 11/1960 | Bonn | 340—166 |
| 2,973,437 | 2/1961 | Bradley et al. | 340—166 |
| 2,992,409 | 7/1961 | Lawrence | 340—166 |

NEIL C. READ, *Primary Examiner.*

A. J. KASPER, *Assistant Examiner.*